(12) United States Patent
Neelakantan et al.

(10) Patent No.: US 10,161,518 B2
(45) Date of Patent: Dec. 25, 2018

(54) PARK CONTROL SYSTEM FOR A VEHICLE TRANSMISSION

(71) Applicant: GM GLOBAL TECHNOLOGY OPERATIONS LLC, Detroit, MI (US)

(72) Inventors: Vijay A Neelakantan, Rochester Hills, MI (US); Christopher G Benson, Rochester Hills, MI (US)

(*) Notice: Subject to any disclaimer, the term of this patent is extended or adjusted under 35 U.S.C. 154(b) by 187 days.

(21) Appl. No.: 15/288,399

(22) Filed: Oct. 7, 2016

(65) Prior Publication Data

US 2018/0100581 A1    Apr. 12, 2018

(51) Int. Cl.
    *F16H 63/34*    (2006.01)

(52) U.S. Cl.
    CPC ..... *F16H 63/3466* (2013.01); *F16H 63/3433* (2013.01)

(58) Field of Classification Search
    CPC .......................... F16H 63/3466; F16H 63/3433
    See application file for complete search history.

(56) References Cited

U.S. PATENT DOCUMENTS

| | | | |
|---|---|---|---|
| 6,983,668 B2 | 1/2006 | Powell et al. | |
| 7,204,785 B2* | 4/2007 | Berger | B60W 10/113 192/219.5 |
| 7,832,541 B2* | 11/2010 | Joshi | F16H 63/3416 188/77 R |
| 7,963,882 B2* | 6/2011 | Nishimura | F16H 61/22 477/906 |
| 8,053,691 B2 | 11/2011 | Vemacchia et al. | |
| 8,950,563 B2* | 2/2015 | Kayukawa | B60T 1/06 188/31 |
| 9,321,435 B2 | 4/2016 | Landino et al. | |
| 9,435,428 B2 | 9/2016 | Neelakantan et al. | |
| 9,777,836 B1* | 10/2017 | Lee | F16H 63/3475 |
| 2016/0033037 A1* | 2/2016 | Rhoades | F16H 63/3416 74/411.5 |
| 2016/0069451 A1 | 3/2016 | McDonough et al. | |
| 2016/0208916 A1* | 7/2016 | Kokubu | B60T 1/005 |

* cited by examiner

*Primary Examiner* — Sherry L Estremsky

(57) ABSTRACT

A transmission for a vehicle includes an electro-mechanical park actuator mechanism that provides motive force to an actuator rod of a park actuator, a default to park mechanism that is internal to the transmission housing, and an electro-mechanical park inhibit mechanism that is internal to the transmission housing.

14 Claims, 3 Drawing Sheets

PARK CONTROL SYSTEM FOR A VEHICLE TRANSMISSION

FIELD

The present disclosure relates to a park control system for a vehicle transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission.

Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers. New propulsion system architectures may no longer rely upon clutches and, thus, may no longer incorporate a hydraulic control system.

These control systems must meet specific safety requirements for new transmission and vehicle designs during particular failure modes of operation. In the absence or reduced availability of hydraulic systems in these new propulsion system architectures, these safety related functions are typically met by mounting a system external to the housing of the transmission. A shaft may extend out of the transmission housing and is connected to this external system. This external system must provide several features including: defaulting to park in a complete power loss situation; maintaining an out-of-park configuration when desired despite a single element failure; and maintaining the motive ability to move between the out-of-park configuration and park configuration and vice-versa on command. Since this external component is required to provide all of the features, the external component typically includes electromechanical actuators with motors, sensors, controllers, etc. This external system is bulky, complex with several components, and is quite expensive.

SUMMARY

In an exemplary aspect, a transmission for a vehicle includes an electro-mechanical park actuator mechanism that provides motive force to an actuator rod of a park actuator, a default to park mechanism that is internal to the transmission housing, and an electromechanical park inhibit mechanism that is internal to the transmission housing.

In another exemplary aspect, the mechanical default to park mechanism includes a piston positioned within a cylinder and a spring inside the cylinder and biasing the piston.

In another exemplary aspect, the piston is connected to a park lever that pivots on a shaft and which is connected to an actuator rod of a park actuator.

In another exemplary aspect, the electromechanical park inhibit mechanism includes a pair of separate and independent processors each controlling a separate and independent park inhibit solenoid assembly.

In another exemplary aspect, the transmission further includes a piston slidably positioned in a cylinder and the piston includes a reduced diameter section.

In another exemplary aspect, one of the park inhibit solenoid assemblies includes a shaft selectively energizable by the corresponding processor to hold the shaft in the reduced diameter section of the piston to latch the piston into a position within the cylinder.

In another exemplary aspect, the transmission further includes a spring within the cylinder and biasing the piston. The piston further includes a ramp surface adjacent the reduced diameter section, and the spring bias force is sufficient to slide the piston within the cylinder and slide the shaft of the park inhibit solenoid assembly along the ramp to move the shaft out of the reduced diameter section when the park inhibit solenoid assembly is de-energized.

In another exemplary aspect, the transmission further includes separate and independent position switches providing redundant signals indicating one of an out-of-park configuration and a park configuration of the transmission.

In this manner, all desired features may be met using components internal to the transmission housing, even in the absence of hydraulic systems, thereby significantly reducing the size of the overall system, improving packaging, reducing weight, and providing improved diagnostic abilities and control.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
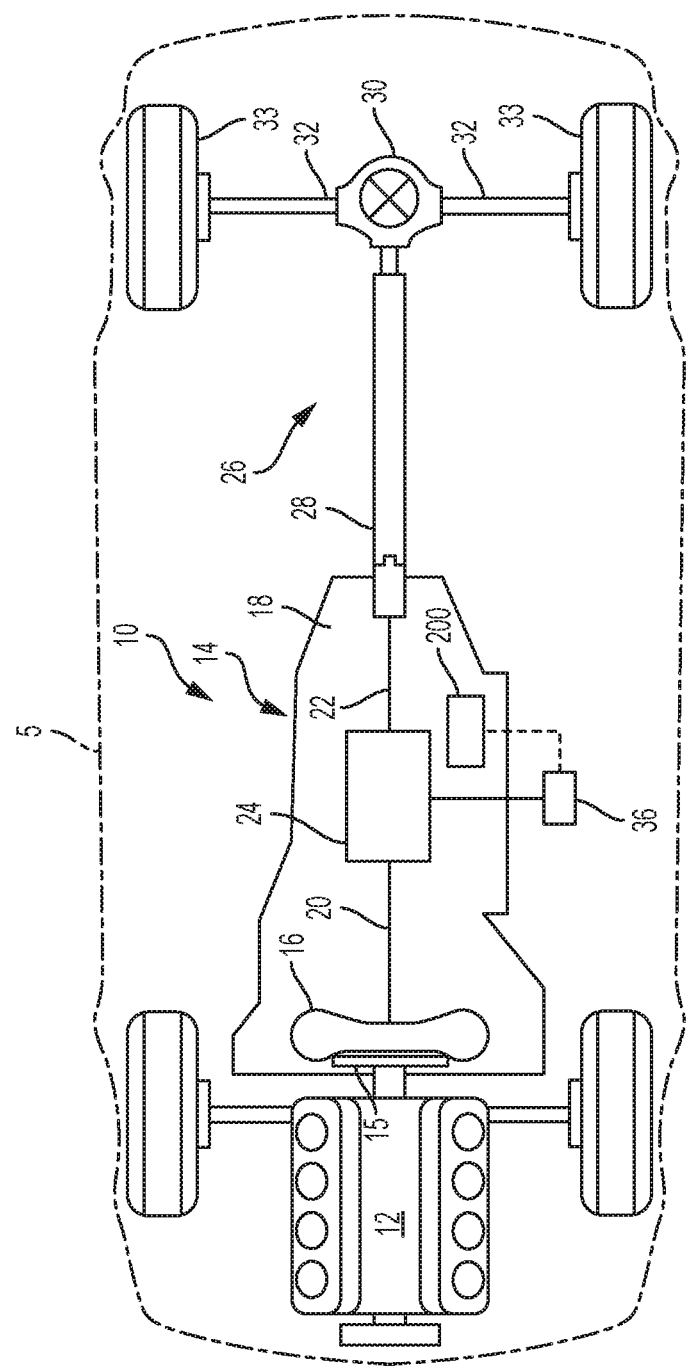
FIG. 1 is a schematic diagram of an exemplary propulsion system in a vehicle.

With reference to FIG. 1, a vehicle is illustrated and generally indicated by reference number 5. The vehicle 5 is illustrated as a passenger car, but it should be appreciated that the vehicle 5 may be any type of vehicle, such as a truck, van, sport-utility vehicle, etc. The vehicle 5 includes an exemplary propulsion system 10. It should be appreciated at the outset that while a rear-wheel drive propulsion system has been illustrated, the vehicle 5 may have a front-wheel drive propulsion system without departing from the scope of the present invention. The propulsion system 10 generally includes a prime mover 12 interconnected with a transmission 14.

The prime mover 12 may be a conventional internal combustion engine or an electric engine, hybrid engine, or any other type of prime mover, without departing from the scope of the present disclosure. The prime mover 12 may supply a driving torque to the transmission 14 through a flex plate 15 or other connecting device that is connected to a starting device 16. The starting device 16 may be a hydrodynamic device, such as a fluid coupling or torque converter, a wet dual clutch, or an electric motor. It should be appreciated that any starting device between the prime mover 12 and the transmission 14 may be employed including a dry launch clutch.

The transmission 14 has a typically cast, metal housing 18 which encloses and protects the various components of the transmission 14. The housing 18 may include a variety of apertures, passageways, shoulders and flanges which position and support these components. Generally speaking, the transmission 14 includes a transmission input shaft 20 and a transmission output shaft 22. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 may be connected with a final drive unit 26 which includes, for example, a prop shaft 28, differential 30, and drive axles 32 connected to wheels 33.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 14 may vary without departing from the scope of the present disclosure.

The transmission 18 includes a transmission control module 36. The transmission control module 36 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. In another example, the transmission control module 36 is an engine control module (ECM), or a hybrid control module, or any other type of controller.

Figure 2:
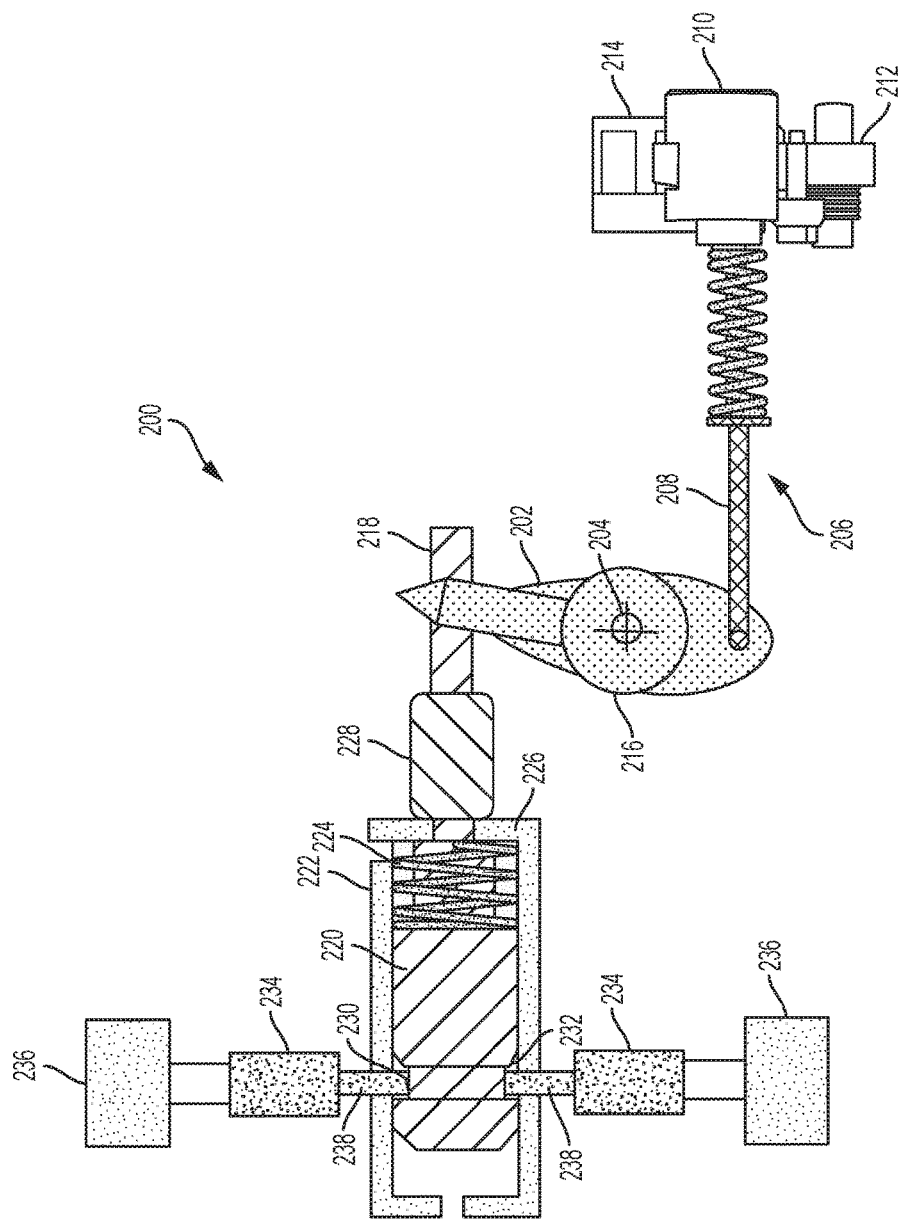
FIG. 2 is a schematic diagram of an exemplary park control system in an out-of-park configuration.
Figure 3:
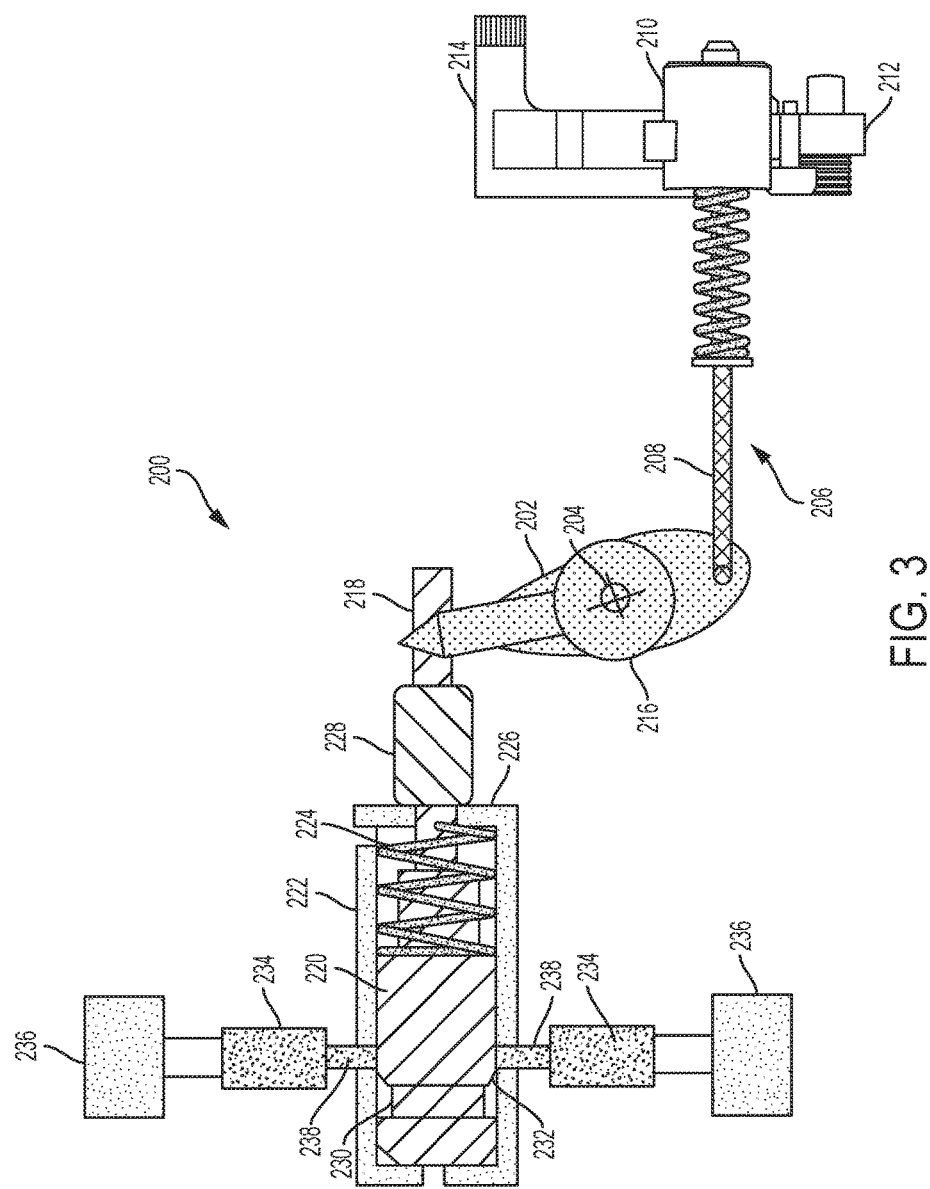
FIG. 3 is a schematic diagram of the park control system of FIG. 2 in a park configuration.

FIG. 1 also shows a schematic representation of a park control system 200 positioned within the transmission housing 18 and in communication with the transmission control module 36. FIGS. 2 and 3, illustrate an exemplary park control system 200 in accordance with the invention. The system 200 includes a park lever 202 that pivots on a park lever shaft 204. The park lever 202 is connected to a park actuator 206 which includes an actuator rod assembly 208 that engages a park guide 210 to cause a park pawl 212 to selectively engage with a park gear 214. A simple electromechanical actuator 216 is also mounted on the park lever shaft 204 and is actuable to provide motive force to selectively rotate the park lever 202 on the park lever shaft 204.

A park piston 218 is also connected to the park lever 202. A land 220 of the park piston 218 is positioned within a cylinder 222 and a default to park spring 224 is captured within the cylinder 222 and abuts the land 220 on one end and an end 226 of the cylinder 222 at the other end of the default to park spring 224. A park position sensor 228 is located adjacent to the park piston 218 to detect a position of the park piston 218 within the cylinder 222 and to output a redundant signal indicative of that position. The park piston 218 also includes a reduced diameter section 230 with a ramp surface 232.

The park control system 200 further includes two separate and independently controlled park inhibit solenoid assemblies 234 which are each independently and separately controlled by a corresponding respective processor 236. Each park inhibit solenoid assembly 234 includes a shaft 238 which is spring biased to protrude outward. Each park inhibit solenoid assembly 234 can also be selectively energized to latch the shaft into the reduced diameter section 230 of the park piston 218 with high enough force.

Operation of the park control system 200 is now explained in reference to FIGS. 2 and 3. FIG. 2 illustrates the park control system 200 in the out-of-park configuration. The electromechanical actuator 216 rotates the park lever 202 clockwise to pull the park actuator 206 out of park and to compress the default to park spring 224. The two processors 236 each independently and separately energize their correspondingly associated park inhibit solenoid assemblies 234 which each hold their shaft in the reduced diameter sections 230 of the park piston 218 with sufficient force. This latches the park piston 218 in the out-of-park position which then holds the position of the park lever 202 and connected park actuator 206 such that it maintains the out-of-park condition. Having two pairs of independent and separate processors 236 and park inhibit solenoid assemblies 234 provides redundancy which ensures that failure of either one does not result in an inadvertent entry into a park condition.

When conditions are appropriate, the park control system 200 may transition into the park configuration illustrated in FIG. 3. The two processors 236 may de-energize their respective park inhibit solenoid assemblies 234 which causes each of them to unlatch their respective shaft in the reduced diameter sections 230 of the park piston 218. The default-to-park spring 224 biases the park piston 218 to the left in the figure which rotates the park lever 202 to rotate counter-clockwise and pushes the park actuator 206 into the park position and the shaft of each park inhibit solenoid assembly 234 will be forced to withdraw due to the ramp section 232 of the park piston 218. Optionally, the electromechanical actuator 216 may apply a torque to the park lever 202 to assist in rotating the park lever 202 in a counter-clockwise direction. The default to park spring 224 is preferably strong enough to bias the move the park piston 218 to the left (i.e. the park position) even if the electromechanical actuator 216 fails to apply a torque sufficient to rotate the park lever in the counter-clockwise direction on its own. The park piston 218 includes ramp sections 232 which enable the default-to-park spring 224 to both move the park piston 218 to the park position while simultaneously pushing both of the park inhibit solenoid assemblies 234 shafts 238 out of the reduced diameter sections 230 of the park piston 218.

Both the out-of-park and park configurations are confirmed by the redundant switches in the position sensor 228.

In this manner, even in a situation where power may be lost to the entire system, the default-to-park spring 224 ensures that the park control system 200 achieves the park configuration. Further, in those situations where we want to ensure that the park control system 200 stays in the out-of-park configuration, single element failure does not result in entry into a park configuration. The redundant pairs of processors 236 and park inhibit solenoid assemblies 234 ensure that single failure of any one of those elements does not result in undesirable entry into a park configuration. Lastly, the electromechanical actuator 216 provides the ability to control when we enter into either configuration whether it is an out-of-park configuration or a park configuration.

Additionally, with the exception of the electromechanical actuator 216, the park system 200 is entirely located within the housing 18 of the transmission 14. Thus, obviating any requirement for externally mounted components which require additional space. The park system 200 is very compact and easily positioned within the housing 18 of the transmission.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
   a prime mover in communication with an input shaft of a transmission;
   an output shaft of the transmission in communication with a final drive and drive wheels;
   an electro-mechanical park actuator mechanism that provides motive force to an actuator rod of a park actuator;
   a default to park mechanism that is internal to the transmission housing; and
   an electromechanical park inhibit mechanism that is internal to the transmission housing, wherein the mechanical default to park mechanism comprises a piston positioned within a cylinder and a spring inside the cylinder and biasing the piston.

2. The vehicle of claim 1, wherein the piston is connected to a park lever that pivots on a shaft and which is connected to an actuator rod of a park actuator.

3. The vehicle of claim 1, wherein the electromechanical park inhibit mechanism comprises a pair of separate and independent processors each controlling a separate and independent park inhibit solenoid assembly.

4. The vehicle of claim 3, wherein the piston includes a reduced diameter section.

5. The vehicle of claim 4, wherein one of the park inhibit solenoid assemblies comprises a shaft selectively energizable by the corresponding processor to hold the shaft in the reduced diameter section of the piston to latch the piston into a position within the cylinder.

6. The vehicle of claim 5, wherein the piston further comprises a ramp surface adjacent the reduced diameter section, and wherein the spring bias force is sufficient to slide the piston within the cylinder and slide the shaft of the park inhibit solenoid assembly along the ramp to move the shaft out of the reduced diameter section when the park inhibit solenoid assembly is de-energized.

7. The vehicle of claim 1, further comprising separate and independent position switches providing redundant signals indicating one of an out-of-park configuration and a park configuration of the transmission.

8. A transmission for a vehicle comprising:
   an electro-mechanical park actuator mechanism that provides motive force to an actuator rod of a park actuator;
   a default to park mechanism that is internal to the transmission housing; and
   an electromechanical park inhibit mechanism that is internal to the transmission housing, wherein the mechanical default to park mechanism comprises a piston positioned within a cylinder and a spring inside the cylinder and biasing the piston.

9. The transmission of claim 8, wherein the piston is connected to a park lever that pivots on a shaft and which is connected to an actuator rod of a park actuator.

10. The transmission of claim 8, wherein the electromechanical park inhibit mechanism comprises a pair of separate and independent processors each controlling a separate and independent park inhibit solenoid assembly.

11. The transmission of claim 10, wherein the piston includes a reduced diameter section.

12. The transmission of claim 11, wherein one of the park inhibit solenoid assemblies comprises a shaft selectively energizable by the corresponding processor to latch in the reduced diameter section of the piston to latch the piston into a position within the cylinder.

13. The transmission of claim 12, wherein the piston further comprises a ramp surface adjacent the reduced diameter section, and wherein the spring bias force is sufficient to slide the piston within the cylinder and slide the shaft of the park inhibit solenoid assembly along the ramp to move the shaft out of the reduced diameter section when the park inhibit solenoid assembly is de-energized.

14. The transmission of claim 8, further comprising separate and independent position switches providing redundant signals indicating one of an out-of-park configuration and a park configuration of the transmission.

* * * * *